US010589850B2

(12) United States Patent
Nissen et al.

(10) Patent No.: US 10,589,850 B2
(45) Date of Patent: Mar. 17, 2020

(54) EROSION PROTECTION SYSTEM

(71) Applicant: Bell Helicopter Textron Inc., Fort Worth, TX (US)

(72) Inventors: Jeffrey Paul Nissen, Alba, TX (US); John R. McCullough, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 128 days.

(21) Appl. No.: 15/936,866

(22) Filed: Mar. 27, 2018

(65) Prior Publication Data

US 2019/0300167 A1 Oct. 3, 2019

(51) Int. Cl.
*B64C 27/473* (2006.01)
*F01D 5/28* (2006.01)
*F04D 29/22* (2006.01)
*B64C 29/00* (2006.01)

(52) U.S. Cl.
CPC ............ *B64C 27/473* (2013.01); *F01D 5/288* (2013.01); *F04D 29/2294* (2013.01); *B64C 29/0033* (2013.01); *B64C 2027/4736* (2013.01)

(58) Field of Classification Search
CPC .............. B64C 27/473; B64C 29/0033; B64C 2027/4736; F01D 5/288; F04D 29/2294
See application file for complete search history.

(56) References Cited

U.S. PATENT DOCUMENTS

| | | | |
|---|---|---|---|
| 2002/0164251 A1* | 11/2002 | Sehgal | B64C 27/473 416/134 A |
| 2009/0092842 A1* | 4/2009 | Hoover | F01D 5/288 428/435 |
| 2013/0101432 A1* | 4/2013 | Harris, Jr. | B64C 11/205 416/241 R |
| 2014/0011414 A1* | 1/2014 | Kruckenberg | B32B 5/16 442/181 |
| 2016/0137856 A1* | 5/2016 | Birnkrant | F04D 29/023 523/218 |
| 2018/0029699 A1* | 2/2018 | Nissen | B64C 27/473 |

* cited by examiner

*Primary Examiner* — Igor Kershteyn
(74) *Attorney, Agent, or Firm* — Lightfoot & Alford PLLC (57) ABSTRACT

An erosion protection system (EPS) has a first erosion protection unit (EPU) having a first ligament and a first scale attached to the first ligament, the first scale having an outer hardness that is greater than a hardness of the first ligament. The EPS also has a second EPU having a second ligament and a second scale attached to the second ligament, the second scale having an outer hardness that is greater than a hardness of the second ligament. The EPS also has an interstitial space between the first ligament and the second ligament wherein at least one of (1) the first scale overlaps at least a portion of the second EPU and (2) the second scale overlaps at least a portion of the first EPU.

20 Claims, 13 Drawing Sheets

EROSION PROTECTION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Aircraft such as tiltrotor helicopters commonly comprise rotor blade erosion protection systems (EPSs), typically heavy metallic rotor abrasion strips wrapped over rotor blade leading edges, for preventing erosion of rotor blades. Such erosion protection is increasingly important when an aircraft is utilized in an environment with significant amounts of easily airborne heavy particulate matter, such as desert sand in desert environments. Current rotor blade EPSs are typically stiff and are bonded to an otherwise flexible rotor blade, thereby undesirably reducing the flexibility of the rotor blade thereby potentially limiting the natural response of the flexible rotor blade. There remains a need for improved EPSs that are lighter, longer lasting, better able to withstand wear, and able to absorb an increased amount of particulate matter impact energy without transferring substantially the entire impact load to already strained portions of the underlying rotor blades.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
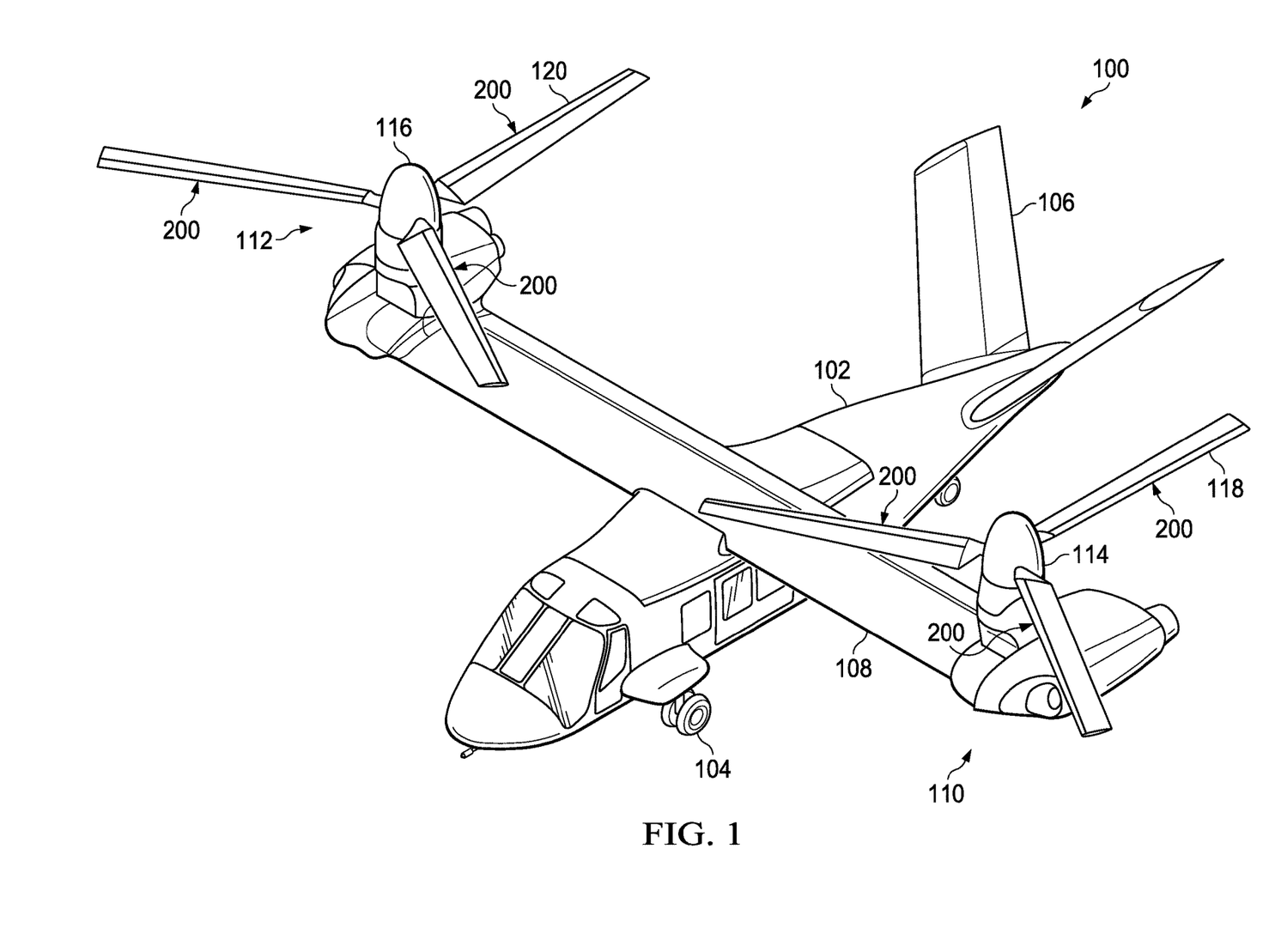
FIG. 1 is an oblique view of a tiltrotor aircraft in a helicopter mode of operation, the tiltrotor aircraft comprising multiple erosion protection systems (EPSs) of this disclosure.
Figure 2:
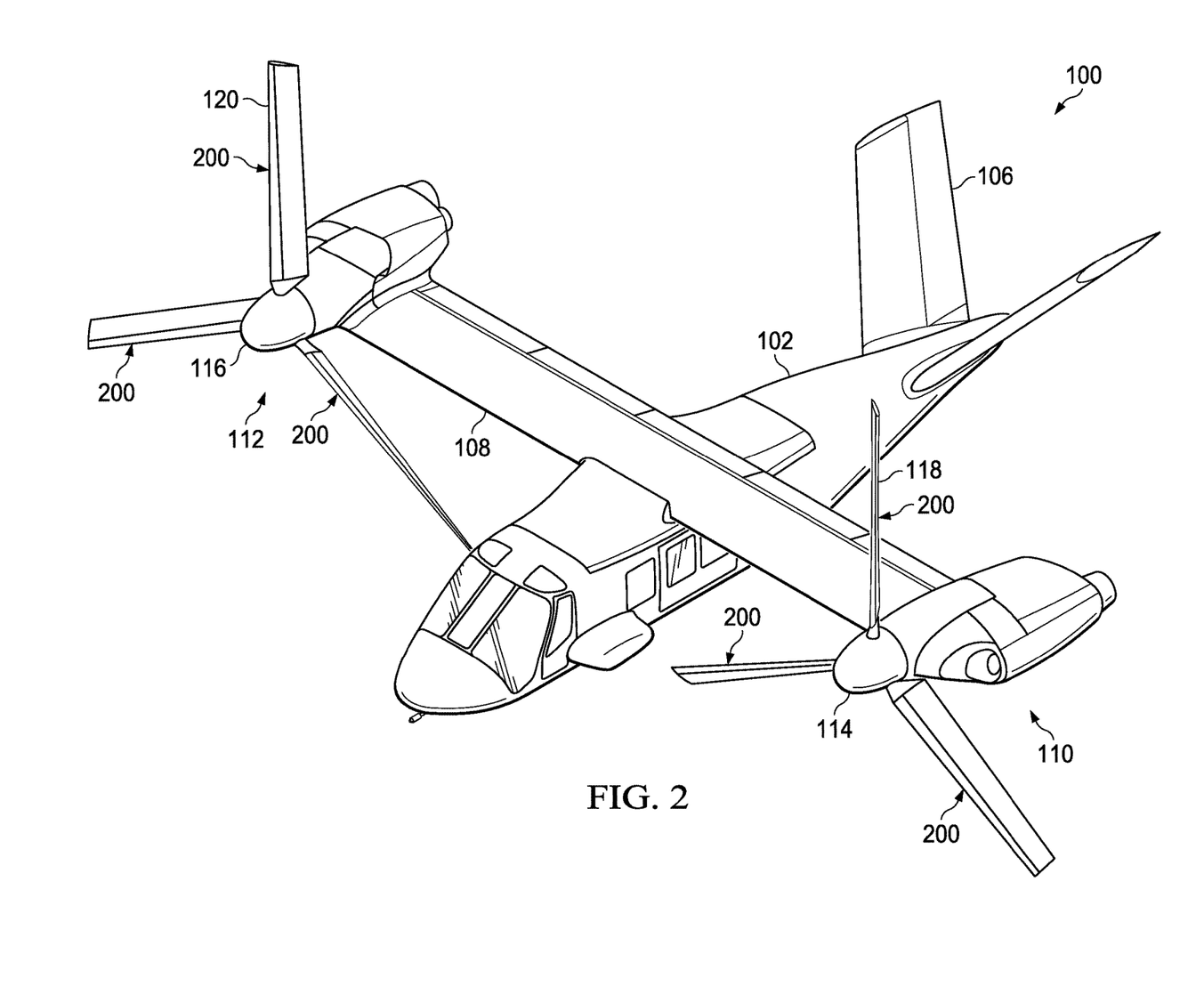
FIG. 2 is an oblique view of the tiltrotor aircraft of FIG. 1 in an airplane mode of operation.

Referring to FIGS. 1 and 2 in the drawings, a tiltrotor aircraft 100 is illustrated. Tiltrotor aircraft 100 includes a fuselage 102, a landing gear 104, a tail member 106, a wing 108, a propulsion system 110, and a propulsion system 112. Each propulsion system 110 and 112 includes a fixed engine and a rotatable proprotor 114 and 116, respectively. Each rotatable proprotor 114 and 116 has a plurality of rotor blades 118 and 120, respectively, associated therewith. The position of proprotors 114 and 116, as well as the pitch of rotor blades 118 and 120, can be selectively controlled to selectively control direction, thrust, and lift of tiltrotor aircraft 100.

FIG. 1 shows a tiltrotor aircraft 100 in a grounded helicopter mode, in which proprotors 114 and 116 are positioned substantially vertical to provide a lifting thrust. FIG. 2 shows tiltrotor aircraft 100 in an airplane mode, in which proprotors 114 and 116 are positioned substantially horizontal to provide a forward thrust in which a lifting force is supplied by wing 108. It should be appreciated that tiltrotor aircraft 100 can be operated such that proprotors 114 and 116 are selectively positioned between airplane mode and helicopter mode, which can be referred to as a conversion mode. The tiltrotor aircraft 100 further comprises multiple erosion protection systems (EPSs) 200, an EPS 200 being associated with each of the rotor blades 118 and 120.

Figure 3:
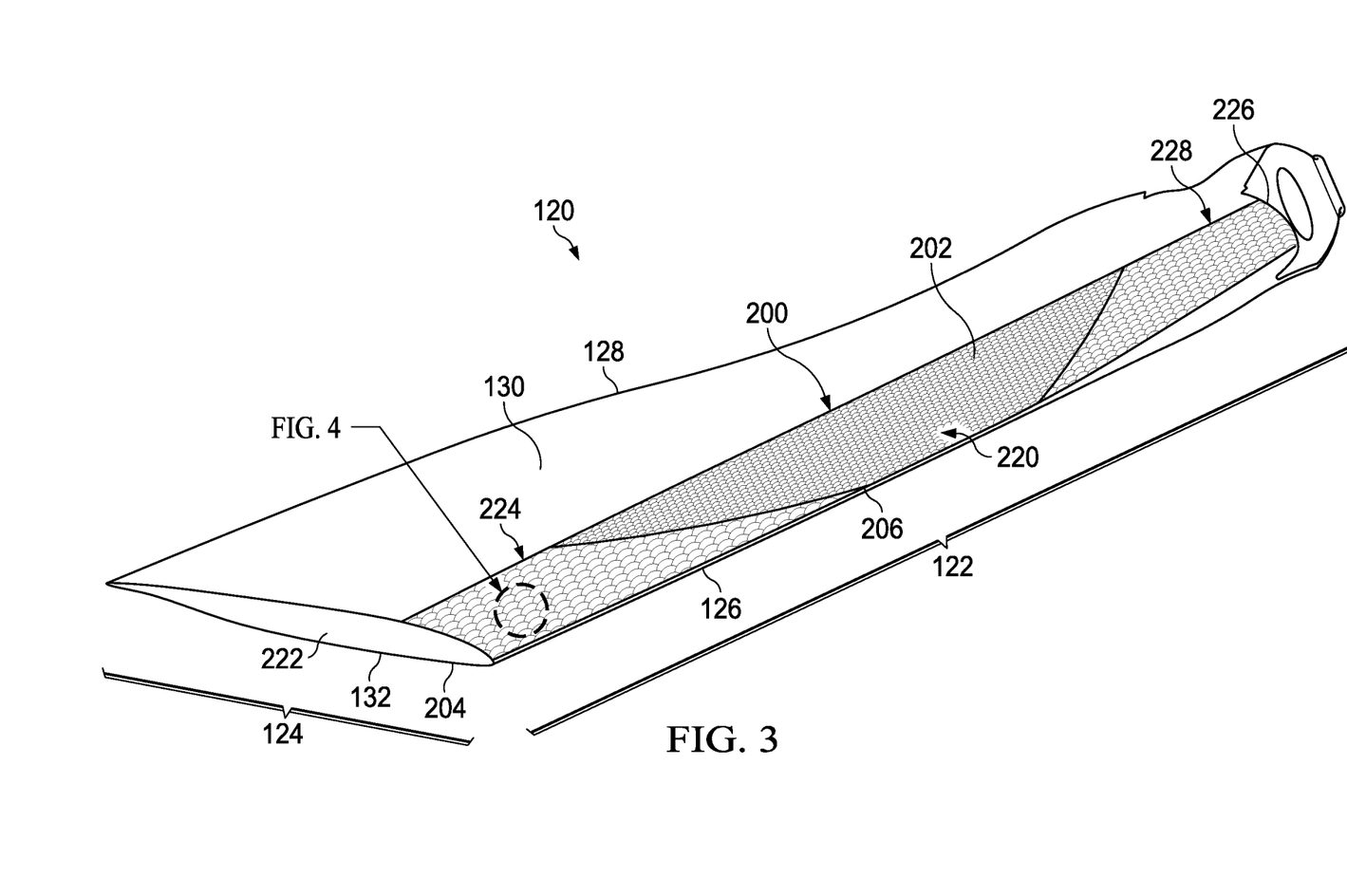
FIG. 3 is an oblique view of a rotor blade of the tiltrotor aircraft of FIG. 1 comprising an EPS.
Figure 4:
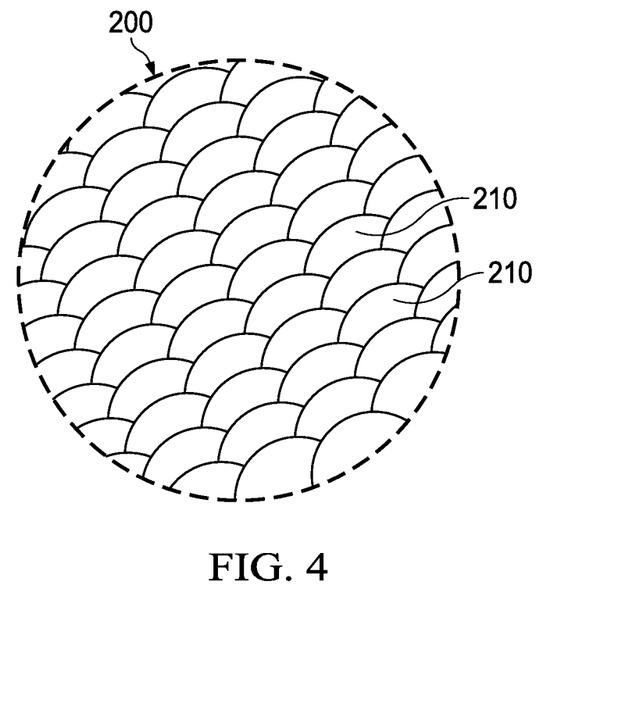
FIG. 4 is a magnified view of a portion of the EPS of FIG. 3.

FIG. 3 shows a rotor blade 120 in isolation from the remainder of tiltrotor aircraft 100. Rotor blade 120 generally comprises a span length 122, a chord length 124, a leading edge 126, a trailing edge 128, an upper surface 130, and a lower surface 132. In this embodiment, an EPS 200 is disposed on both the upper surface 130 and lower surface 132 in a manner that generally wraps over the leading edge 126. Accordingly, the EPS 200 comprises an upper portion 202 and a lower portion 204. The EPS 200 further comprises a transition portion 206 disposed generally along the leading edge 126. FIG. 4 shows a magnified view of a portion of the upper portion 202 of the EPS 200.

Figure 5:
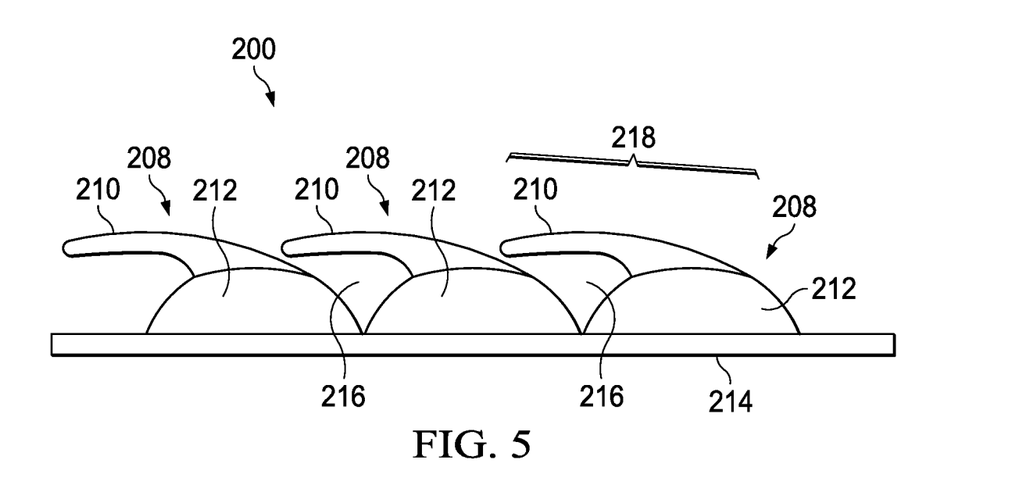
FIG. 5 is a side view of a portion of the EPS of FIG. 3.

Referring now to FIG. 5, a side view of a portion of the EPS 200 is shown. The EPS 200 generally comprises a plurality of erosion protection units (EPUs) 208. Each EPU 208 comprises a scale 210 attached to a ligament 212. The ligaments 212 are each attached to a common substrate 214. Interstitial spaces 216 exist between adjacent ligaments 212. In some embodiments, the scales 210 comprise a shape substantially similar to cycloid scales of a fish or reptile, however, any other suitable scale shape can be utilized so long as the scale 210 at least partially covers a portion of an EPU 208 located laterally adjacent (offset along the span direction) and/or relatively downstream (generally along the chord direction). Most generally, the scales 210 are provided to serve as an abrasion resistant structure comprising a hardness and/or stiffness suitable for withstanding impacts from particulate matter such as, but not limited to, sand and water droplets. In some cases, the scales 210 comprise a maximum dimension 218 of less than about 0.15 inches so that the erosion resistant surface of the scale 210 is larger than the largest anticipated erodent particle size, such as a water droplet. The multiplicity of scales 210, such as those shown in FIG. 4, are provided in sizes that generally approximate an acceptable surface finish for aerodynamic uses. In some cases, the scales of an EPU could be tailored in size, shape, and/or hardness to more effectively shield against one or more selected erodent particles, such as by sizing the scales to resist a particular type of sand particle that is known to exist in a destination operating environment of the tiltrotor aircraft 100. The ligaments can similarly be tailored in size, shape, and/stiffness to best react to one or more selected erodent particles.

In this embodiment, each scale 210 is attached to the substrate 214 via a separate and distinct ligament 212. However, in alternative embodiments, adjacent ligaments 212 can be at least partially joined together or tethered to each other. The ligaments 212 comprise a stiffness that is greater than a stiffness of the substrate 214 but less than a stiffness of the scales 210. Accordingly, each EPU 208 and the EPS 200 as a whole provide a highly abrasion resistant outer surface for shielding against particulate matter impacts while also maintaining the dexterity and flexibility of the underlying rotor blade 118, 120. In response to an erodent particle impacting a scale 210, impact energy is transferred to the substrate 214 via the ligament 212. Depending on the angles at which a scale 210 is struck by an erodent particle, an EPU 208 can react by deforming the ligament 212 so that the ligament 212 is perturbed from an unperturbed state in which the ligament 212 does not occupy interstitial spaces 216 to a perturbed state in which the ligament 212 temporarily occupies an interstitial space 216. The above-described deformation of a ligament 212 dissipates some of the impact energy and transfers some of the impact energy to the relatively more compliant substrate 214 where a remainder of the impact energy can be dissipated. In this manner, an EPU 208 provides the benefit of effectively shielding a rotor blade 118, 120 from abrasion as well as maintaining a flexibility of the underlying rotor blade 118, 120. As compared to when a conventional inflexible metallic abrasion shield is bonded to an otherwise flexible rotor blade 118, 120, the EPS 200 offers improved wear resistance without the undesirable constraining of the rotor blade 118, 120.

As shown in FIG. 3, the rotor blade 120 is provided with three distinct EPU 208 size distribution zones. Because the flexure and related strains of the rotor blade 120 are known to be higher in near the span center, a fine EPU zone 220 is provided in which the size of the scales 210 and associated ligaments 212 are relatively smaller, thereby allowing improved bending capability in the fine EPU zone 220. Because the flexure and related strains of the rotor blade 120 are known to be lowest near rotor blade tip 222, a coarse EPU zone 224 is provided in which the size of the scales 210 and associated ligaments 212 are relatively larger, thereby potentially improving impact resistance and reducing manufacturing related costs. Because the flexure and related strains of the rotor blade 120 are in a midrange near rotor blade root 226, a medium EPU zone 228 is provided in which the size of the scales 210 and associated ligaments 212 are relatively generally sized to be between the sizes of the fine EPU zone 220 and the coarse EPU zone 224. It will further be appreciated that in high abrasion areas, such as near the rotor blade tip 222 where erodent particle impact energy may be higher, scale 210 size and/or ligament 212 size may be increased. Further, in much the same manner the scales 210 and the ligaments 212 are described above as being tailored to accommodate known zone characteristics, the substrate 214 can be similarly adjusted. For example, the substrate 214 can be provided as more flexible in high strain zones of the rotor blade 120 to minimize the impact the EPS 200 has on rotor blade 120 flexibility. Because the EPUs 208 are bonded to the substrate 214 but remain unbonded to the surrounding EPUs 208, each EPU 208 is allowed to strain independently.

Producing the EPUs 208 can be accomplished using a variety of classes of materials. Regardless the class of materials selected, it is contemplated that the scales 210 will be formed of a relatively harder and/or stiffer material as compared to the material used to form the ligament 212. For example, when a plastic based material system is to be utilized, a relatively more erosion durable material, such as a phenolic, can be used to form at least a portion of the scale 210 and the ligament 212 can be formed using an intermediate stiffness material, such as nylon. In this example, the entirety of the scale 210 need not be phenolic and the entirety of the ligament need not be nylon. Instead, the scale 210 can comprise an outermost portion of phenolic followed by a gradually increasing content of nylon. Ultimately, in some embodiments, a portion of the EPU 208 comprising a highest concentration of nylon can be adhesively bonded to the substrate 214, thereby providing a force path from the outermost portion of the scale 210 to the substrate 214 that can be a continuously variable material mixture that generally trends toward a decrease in stiffness and/or hardness and an increase in compliance. In some embodiments, the base or root stiffness and/or hardness of the ligament 212 may be only slightly higher as compared to the substrate 214 to which it is bonded.

Similar relative material property selections and implementations can be used with metallic materials. For example, the scale 210 may be formed at least partially of a hard alloy, such as stainless steel or nickel, and the content of the scale 210 and ligament 212 can be transitioned to comprising a more ductile material that is ultimately bonded to the substrate 214. Ceramic or cemet materials may also be used in this design in which the outer portion of the scale 210 contains a highest concentration of erosion resistant material, such as tungsten carbide or alumina, and the content of the scale 210 and ligament 212 can be transitioned to gradually comprising increased amounts of relatively lower modulus materials such as cobalt, magnesium, or calcium.

Figure 6:
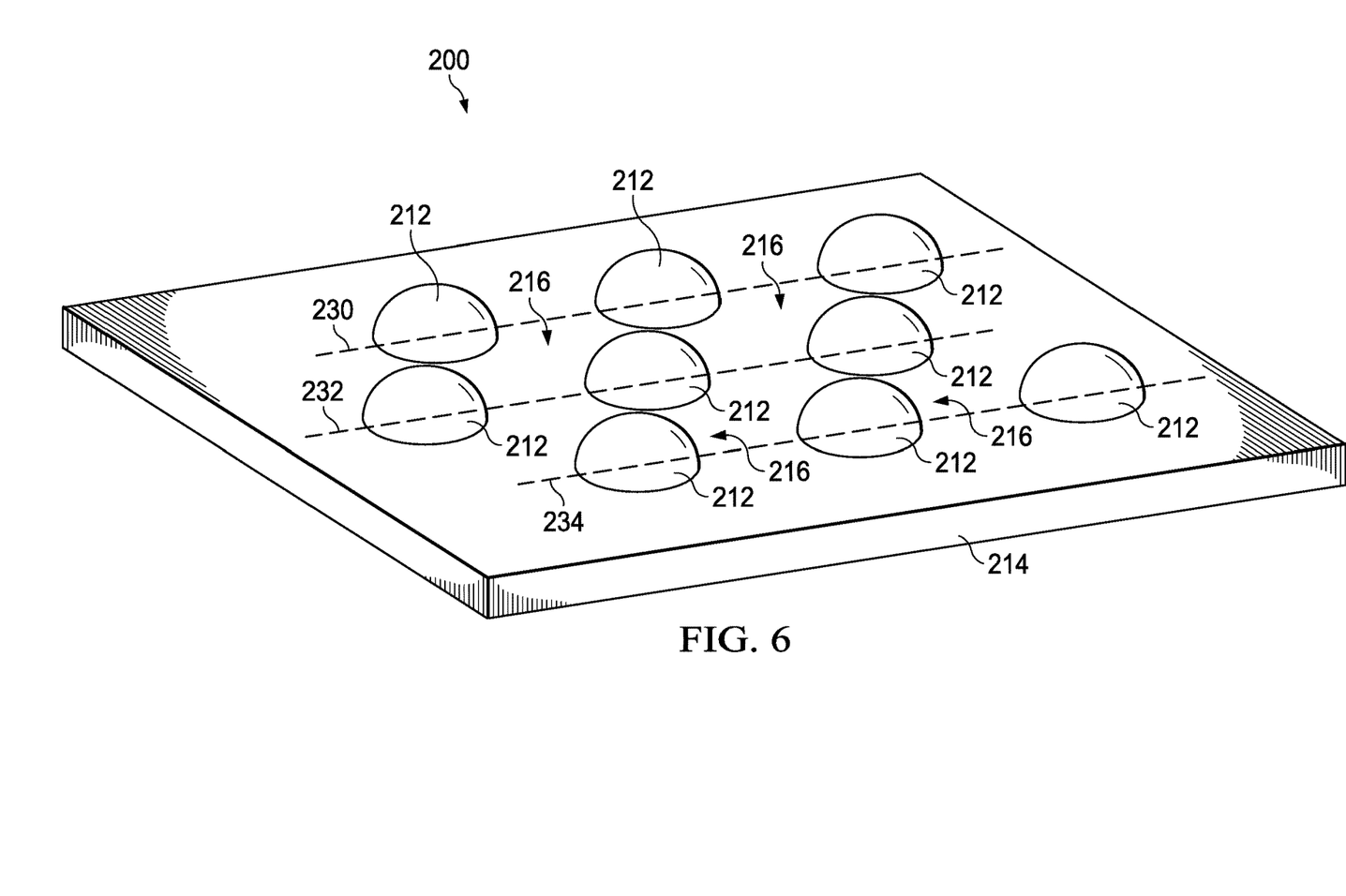
FIG. 6 is an oblique view of a portion of the EPS of FIG. 3 with only the substrate and ligaments shown.

FIGS. 6-9 are provided to illustrate the interrelated nature of the adjacent EPUs 208 of the EPS 200. It is important to note that FIGS. 6-9 do not necessarily demonstrate a typical sequence in which EPUs 208 are generated, but rather, they are provided to ensure a clear understanding and view of interstitial spaces 216 and the way a scale 210 of a first EPU 208 overlays at least portions of an adjacent EPU 208. FIG. 6 shows a plurality of ligaments 212 bonded, adhered, or otherwise attached to the substrate 214. In this embodiment, the ligaments 212 are substantially evenly spaced away from each other along the span direction in a downstream row 230, an intermediate row 232, and an upstream row 234. In this embodiment, the adjacent rows of ligaments 212 are not disposed in a rectangular matrix, but rather, are substantially evenly staggered along the span direction so that the nearest upstream and downstream ligaments (chord direction) are also offset in the span direction. Interstitial spaces 216 generally exist between adjacent ligaments 212 and are free to accommodate the ligaments 212 when they are forced into a deformed and perturbed state.

Figure 7:
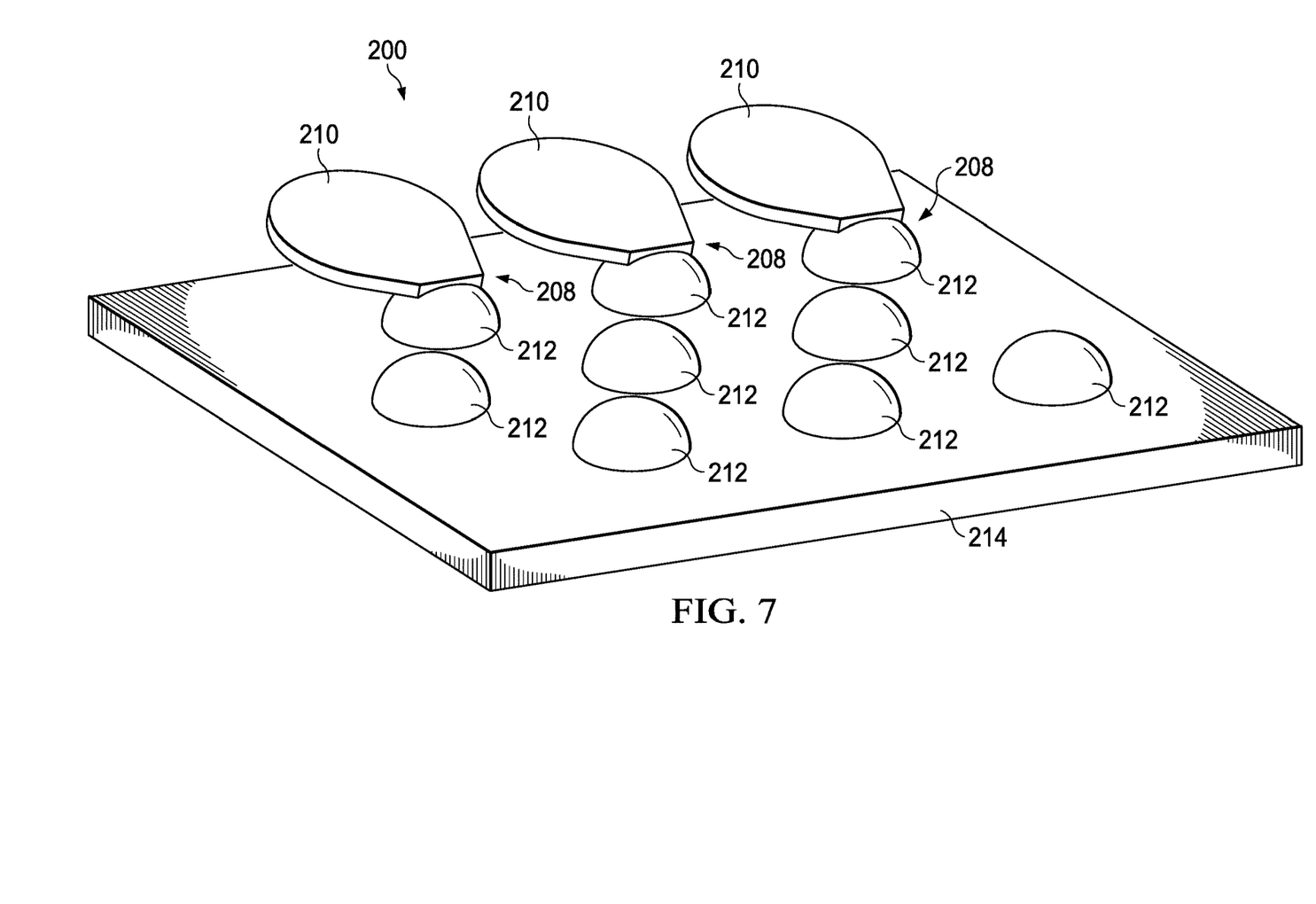
FIG. 7 is an oblique view of the portion of the EPS of FIG. 6 with a downstream row of erosion protection units (EPUs) additionally shown.
Figure 8:
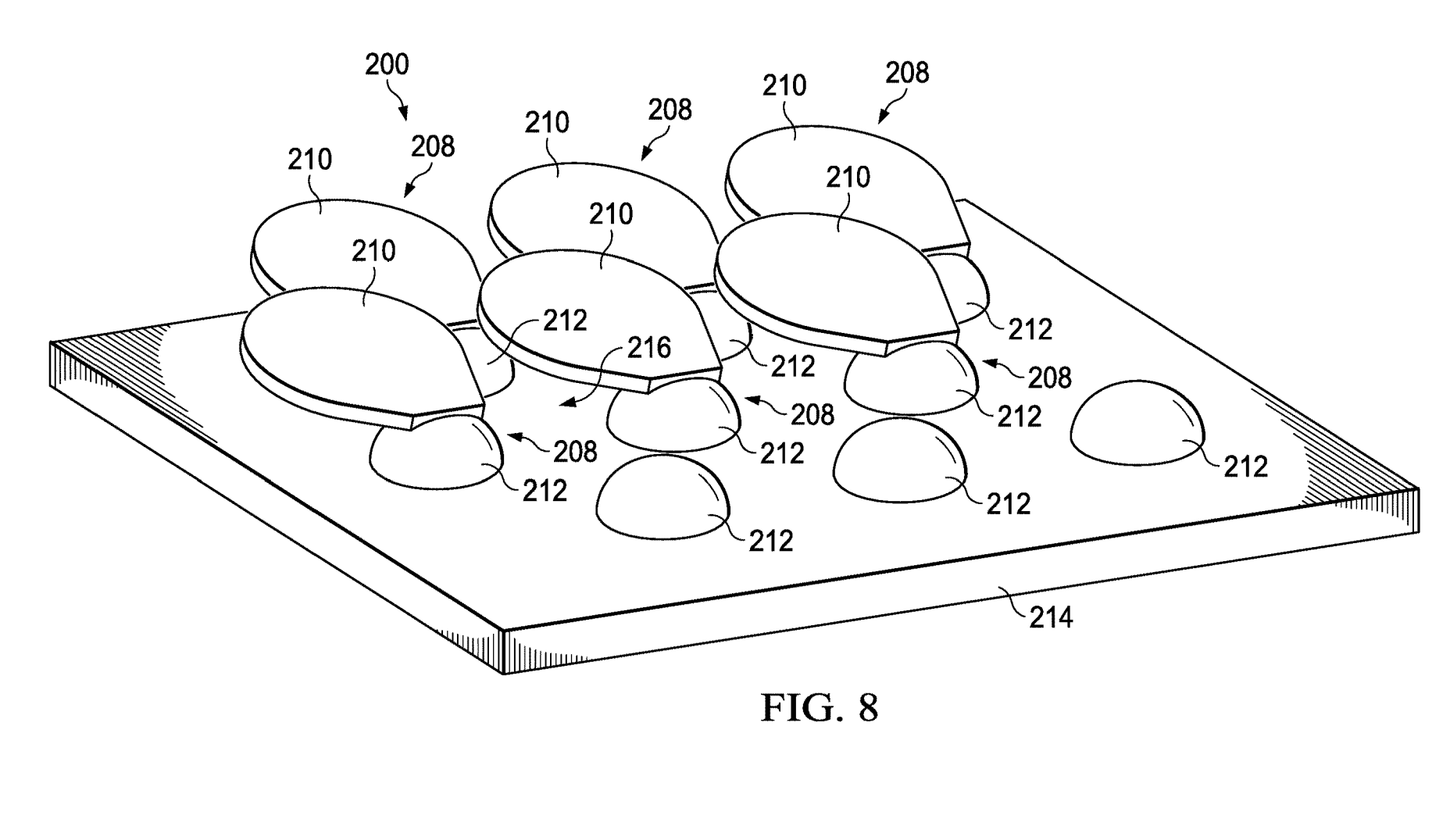
FIG. 8 is an oblique view of the portion of the EPS of FIG. 7 with an intermediate row of EPUs additionally shown.
Figure 9:
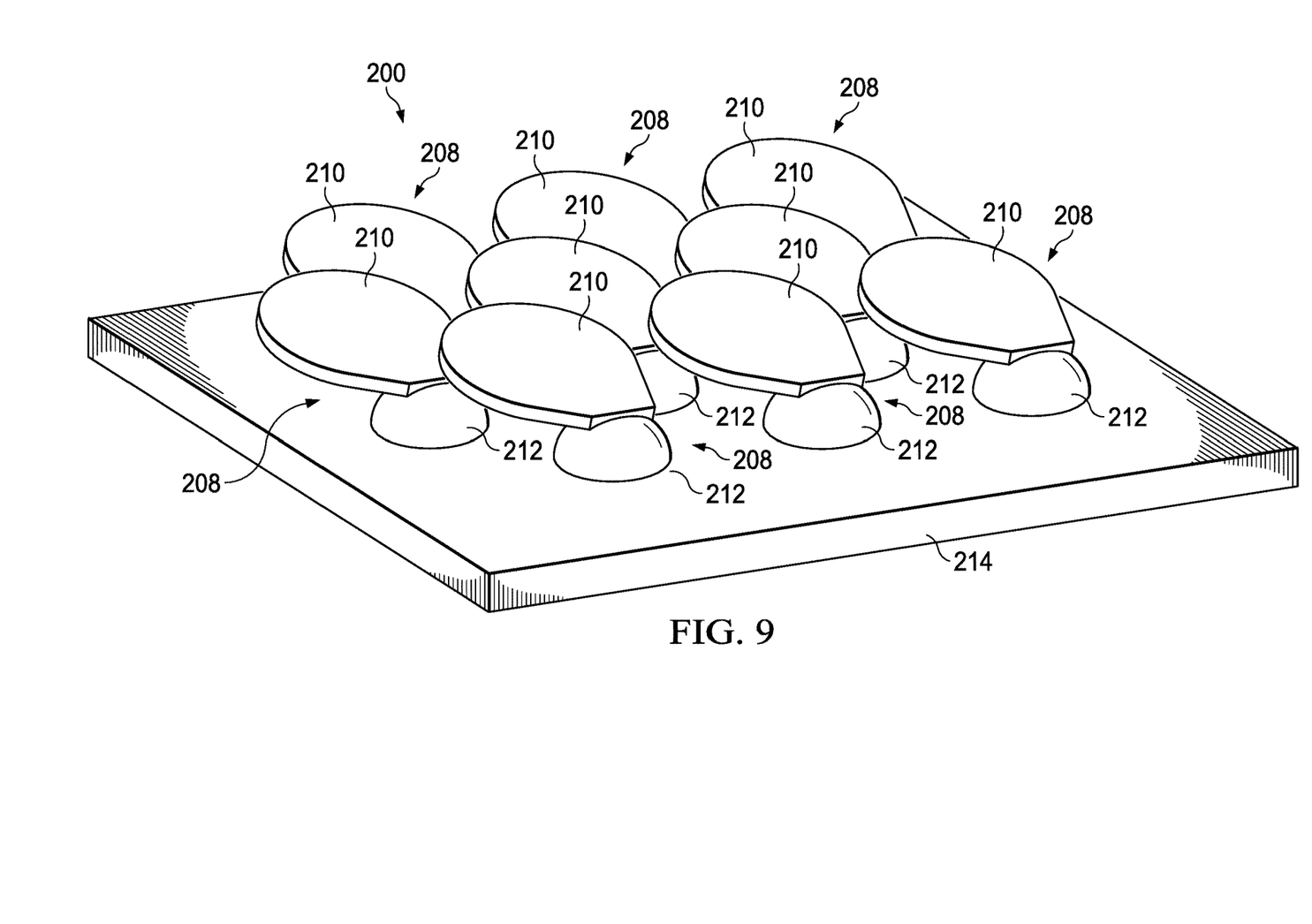
FIG. 9 is an oblique view of the portion of the EPS of FIG. 8 with an upstream row of EPUs additionally shown.

FIG. 7 shows the addition of scales 210 to the ligaments 212 of the downstream row 230. FIG. 7 comprises three complete EPUs 208. In some cases, a most downstream EPU 208 comprises a scale 210 that does not at least partially cover a portion of an adjacent EPU 208. FIG. 8 shows the addition of scales 210 to the ligaments 212 of the intermediate row 232. FIG. 8 comprises six complete EPUs 208. As an example, the middle EPU 208 of the intermediate row 232 comprises a scale 210 that at least partially shields the labeled interstitial space 216 from entry of erodent particles. The middle EPU 208 of the intermediate row 232 also overlays a portion of the two nearest downstream EPUs 208. FIG. 9 shows the addition of scales 210 to the ligaments 212 of the upstream row 234. FIG. 9 comprises nine complete EPUs 208. The middle EPU 208 of the upstream row 234 is not covered by any other EPU 208. In some embodiments, a first or leading row of EPUs 208 may be provided with differently shaped scales 210 or the EPS 200 can comprise an altogether different structure upstream relative to the upstream row 234 to buffer airflow and/or to protect the ligaments 212 and scales 210 in the upstream row 234. It can be seen clearly how the intermediate row 232 EPUs 208 both cover portions of other EPUs 208 and are covered by other EPUs 208 themselves in a cooperative manner that resembles scale armor, fish scales, or reptile scales.

While potential materials for use in forming the EPS 200 is described above, several manufacturing methods are also contemplated. An additive manufacturing process known as fused deposition modeling (FDM) can be used to extrude plastic ligament 212 material onto the substrate 214. The material delivery for the FDM process can comprise use of a continuous spool of thermoplastic material having varied stiffness along the length of the spooled material so that relatively more compliant thermoplastic material is used to form the ligament 212 before transitioning to thermoplastic material with higher stiffness. The higher stiffness material can be used to form the scales 210 in one continuous action. In some cases, the spool of material may be indexed in a lengthwise manner so that a single deposition head system can gauge which material is being utilized as the thermoplastic is extruded. In some embodiments, thermoplastic material is provided with increased stiffness and erosion resistance towards the outermost layer of the scales 210. The FDM process can also utilize multiple separate deposition heads, each with its own material to deposit a variety of materials from multiple material spools or raw material sources.

In other embodiments, rubberlike materials can also be utilized to form EPS 200. In this embodiment, a degree of vulcanization can be varied to provide a desired stiffness of deposited material. In this process, a rubber material is extruded onto the substrate 214 using an appropriately sized nozzle and the level of vulcanization can be increased to provide stiffer and more erosion resistant material for portions of the EPUs 208 that are located further from the underlying rotor blade 118, 120. In yet other embodiments, High Velocity Oxy Fuel (HVOF) deposition processes can be used to spray the ligament 212 onto the substrate 214 using a mask to create individual scale like elements. After creating a scale like element, the mask can be moved to apply a next layer of coating that contains stiffer more erosion resistant material as the EPU 208 is built. This process can be continued to build a 3-D shape of EPUs 208 with compliant ligament 212 sublayers and highly erosion resistant outer layers or scales 210.

In the least, the systems and methods disclosed herein can be utilized to replace use of rotor blade abrasion strips that more easily become damaged and crack. Instead of these failures, EPSs 200 provide a discontinuous array of scale-like elements that can strain independently from the adjacent material. This is particularly beneficial to rotor blades such as the V-22 rotor blades where strain compatibility is critical due to its design. The EPSs 200 are flexible structures that are highly erosion resistant. The additive processes mentioned above allow for a range of cost effective methods to produce 3-D EPUs 208 with an erosion resistant outer layer (scales 210) and a compliant layer (ligament 212) bonded to the substrate 214.

Figure 10:
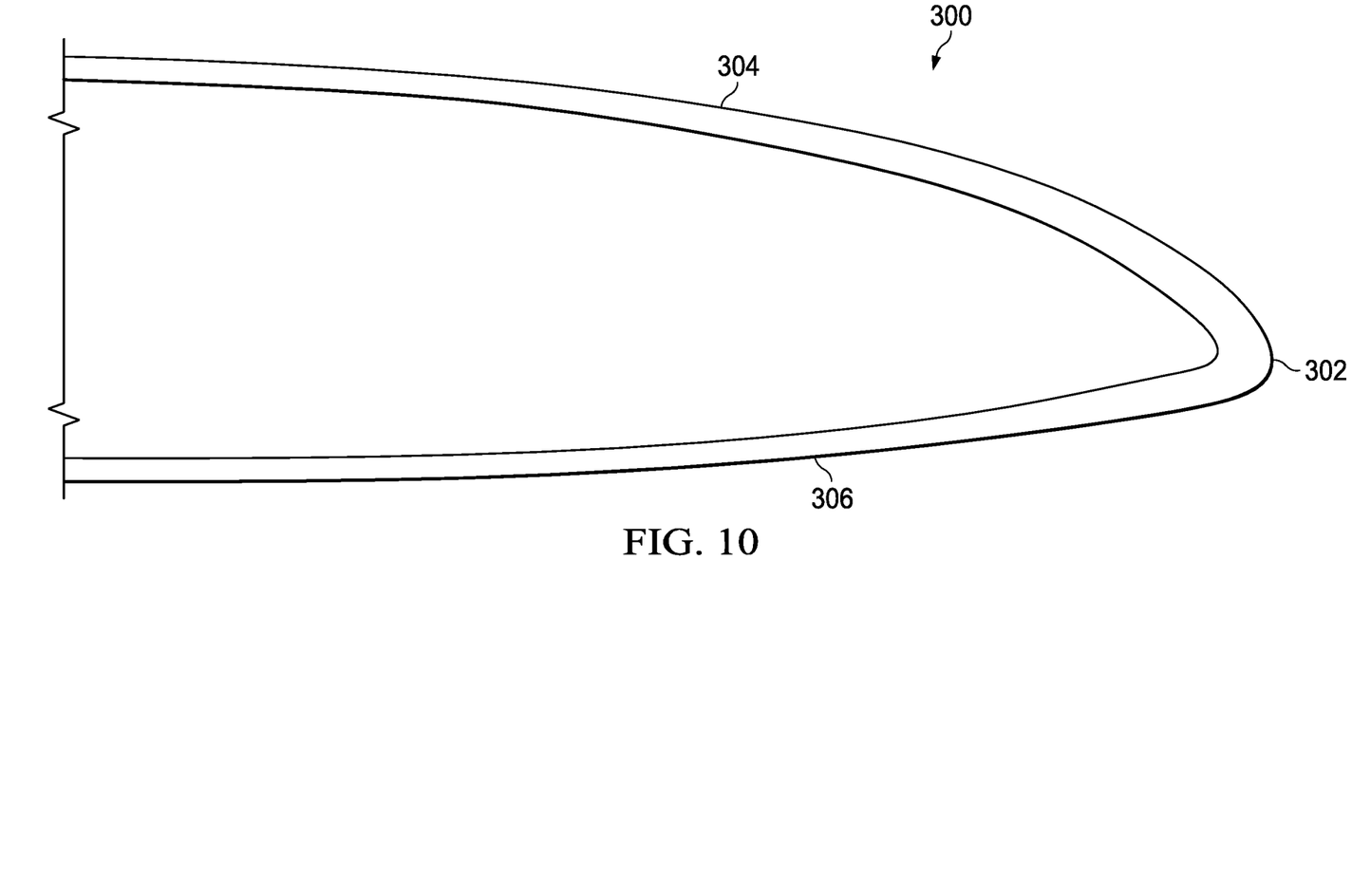
FIG. 10 is a side view representation of a rotor blade profile along which an EPS can be disposed.

Referring to FIG. 10, a side view of a portion of a rotor blade profile 300 is shown. The rotor blade profile 300 comprises a leading edge 302, an upper portion 304, and a lower portion 306. In some embodiments, a substrate such as substrate 214 can be applied along the upper portion 304, over the leading edge 302, and along the lower portion 306. This profile is provided as context for the profile projections illustrated in FIGS. 11-12.

Figure 11:
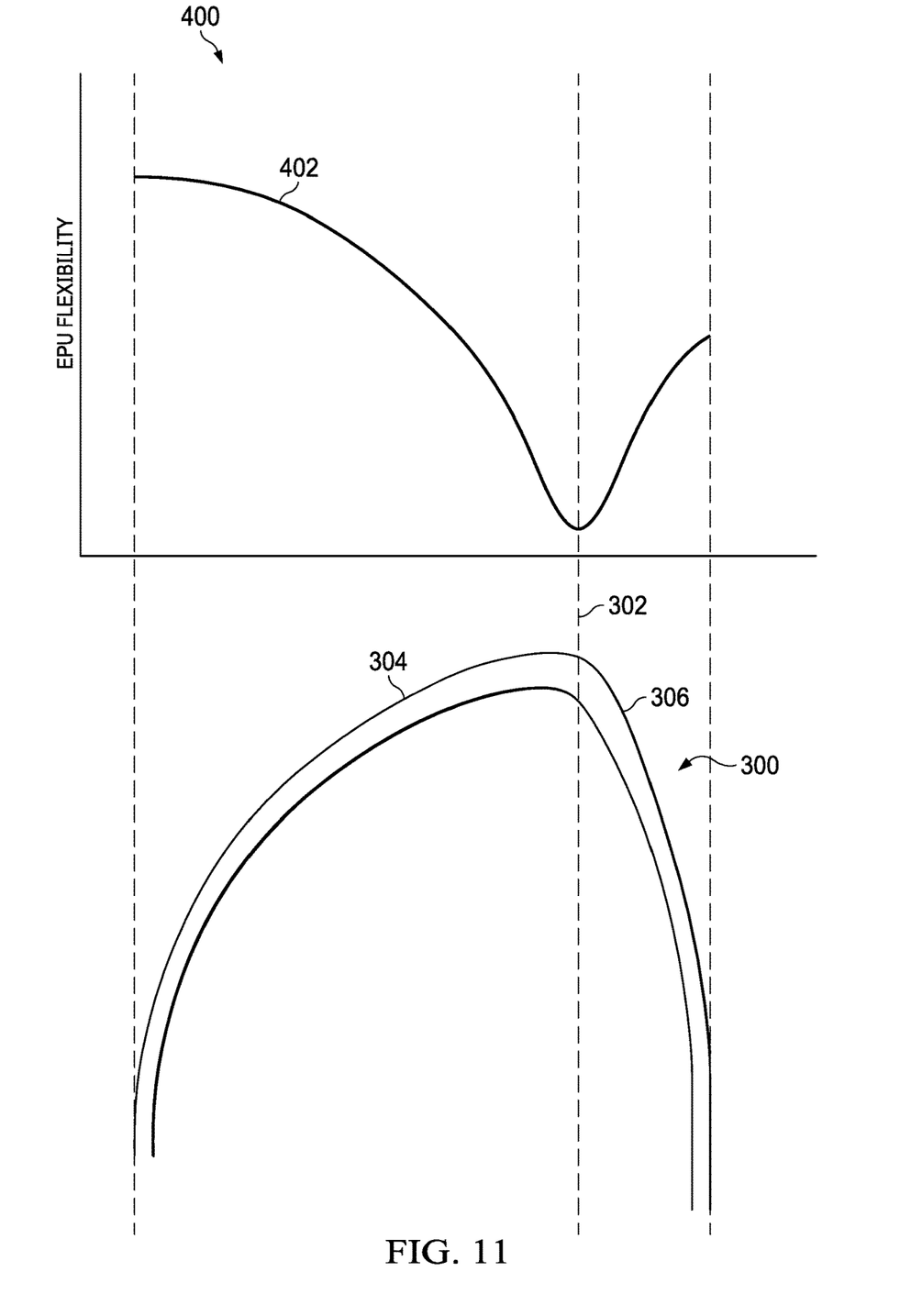
FIG. 11 is a chart showing a curve of EPU flexibility relative to a location on a rotor blade profile.

Referring to FIG. 11, a slightly distorted representation of the rotor blade profile 300 is shown and projected onto a chart 400. The chart 400 plots EPU 208 flexibility, such as a degree of flexibility attributable to ligaments 212, against locations along the rotor blade profile 300. The curve 402 of the chart 400 shows that, in some embodiments, EPU 208 flexibility may gradually reduce as the location is moved along the upper portion 304 toward the leading edge 302. The curve 402 further demonstrates that the EPU 208 flexibility may be at a minimum at a location coincident with the leading edge 302. Finally, the curve 402 shows that EPU 208 flexibility may gradually increase as the location is moved along the lower portion 306 in a direction away from the leading edge 302. In some embodiments, this change in flexibility is associated with the fact that a lesser degree of flexibility is needed at the leading edge 302.

Figure 12:
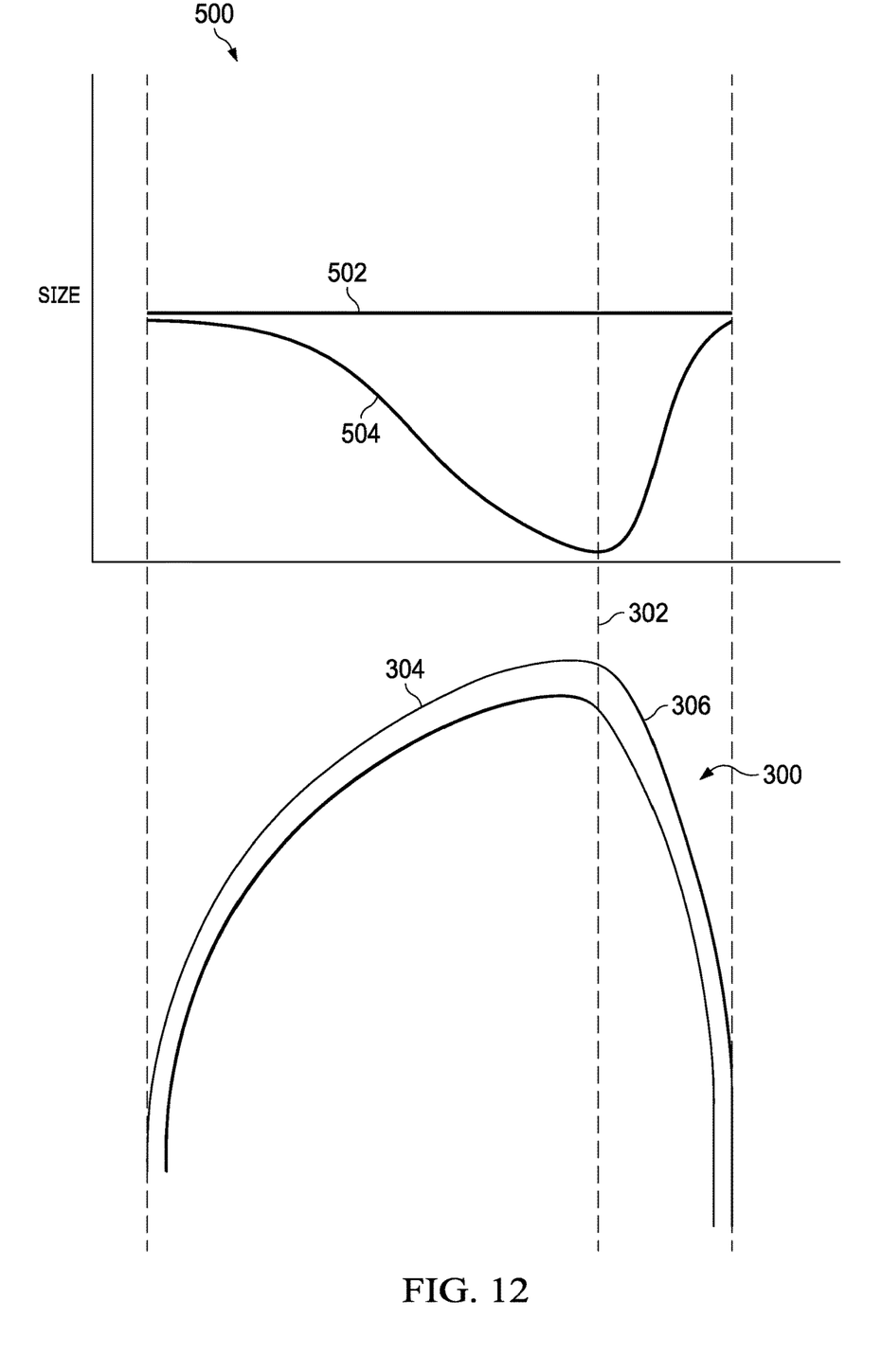
FIG. 12 is a chart showing a scale size curve and a ligament size curve, both relative to a location on a rotor blade profile.

Referring now to FIG. 12, a slightly distorted representation of the rotor blade profile 300 is shown and projected onto a chart 500. The chart 500 provides two curves. Curve 502, which is substantially a horizontal line, represents a substantially constant scale 210 size along the entirety of the rotor blade profile 300. Curve 504 represents ligament 212 size relative to location along the rotor blade profile 300. The chart 500 shows that ligament 212 size can shrink relative to the scale size at locations increasingly closer to the leading edge 302. Again, this change in ligament 212 size is associated with the fact that a lesser degree of flexibility is needed at the leading edge 302.

Figure 13:
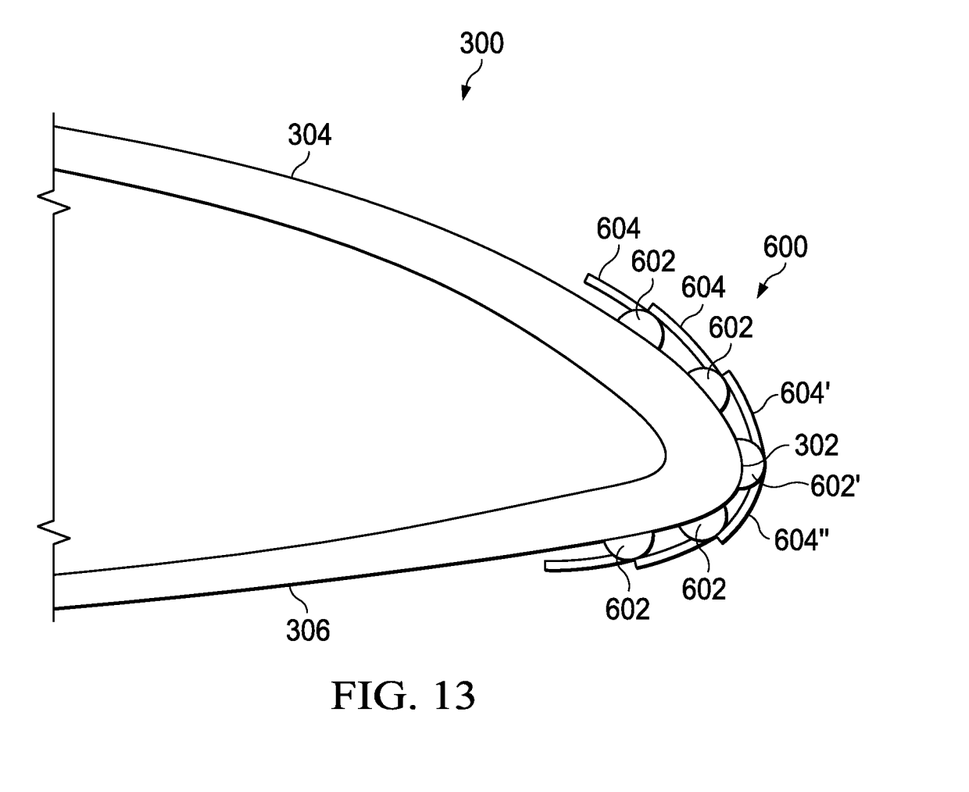
FIG. 13 is a side view of another embodiment of an EPS.

Referring now to FIG. 13, a portion of an EPS 600 is shown applied to a portion of the rotor blade profile 300. The EPS 600 comprises ligaments 602 connected to a substrate (not visible) along a leading edge 302 portion of the rotor blade profile 300. The ligaments 602 are substantially similar to the ligaments 212 and are generally attached to scales 604 substantially similar to scales 210. However, a leading edge ligament 602' is associated with both an upper scale 604' and a lower scale 604". The upper scale 604' extends from the leading edge ligament 602' and overlaps at least a portion of the next adjacent EPU 606 on the upper portion 304. The lower scale 604" extends from the leading edge ligament 602' and overlaps at least a portion of the next adjacent EPU 606 on the lower portion 306.

Figure 14:
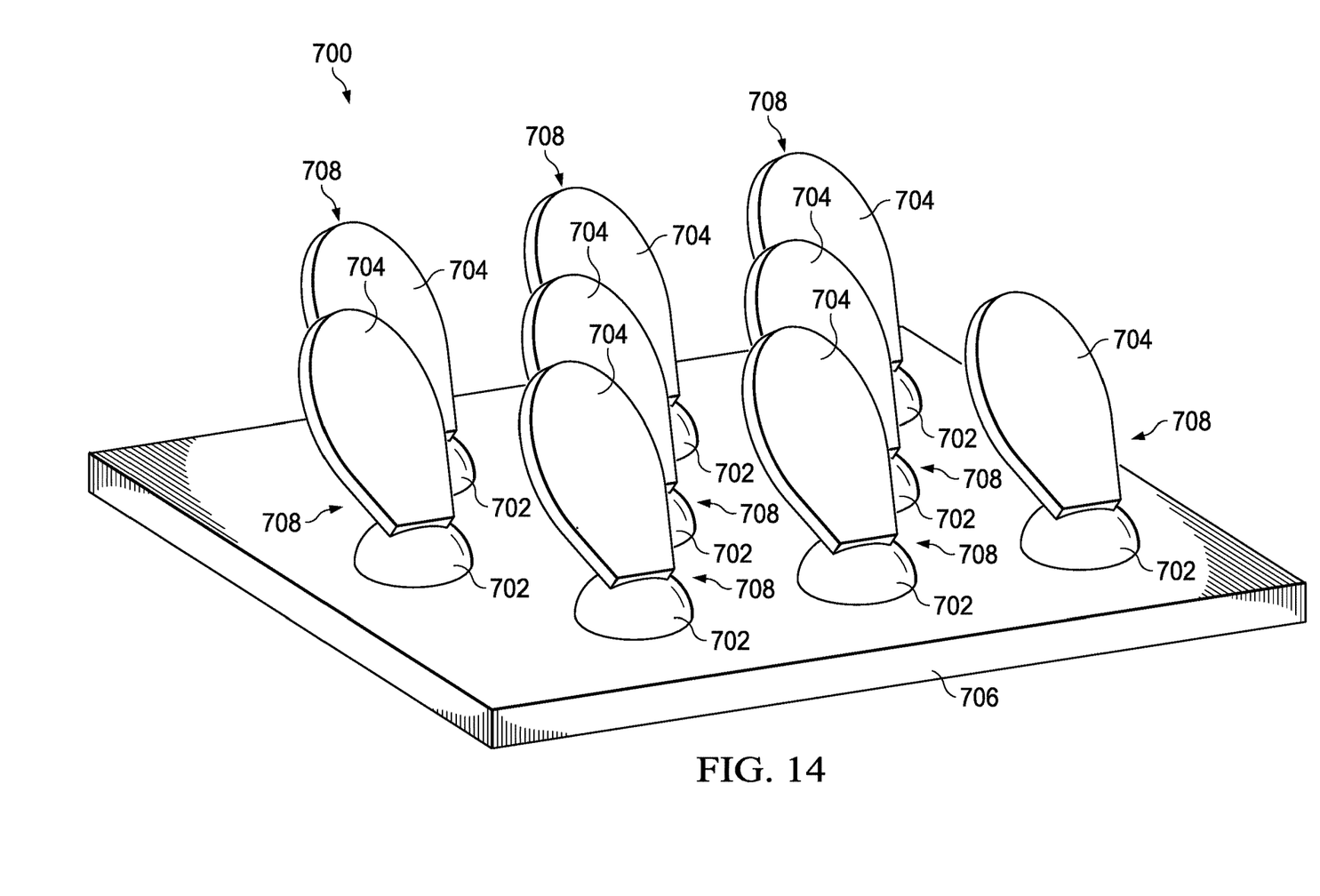
FIG. 14 is an oblique view of another embodiment of an EPS.

Referring now to FIG. 14, an alternative embodiment of an EPS 700 is shown. The EPS 700 comprises responsive ligaments 702 that respond to thermal energy and/or electrical power to alter an orientation of the scales 704. The responsive ligaments 702 are connected to a substrate 706 substantially similar to substrate 214 and the scales 704 are substantially similar to scales 210. FIG. 14 shows nine complete EPUs 708 in an activated and/or deployed state in which the scales 704 are raised relative to the substrate 706. In some cases, the ligaments 702 can be actively or passively controlled to exhibit variable stiffnesses. In this embodiment, the responsive ligaments 702 are shown as causing the scales 704 to stand, which on a macro level can change the effective thickness of the rotor blade to which the EPS 700 is attached, thereby selectively modifying a performance of the rotor blade.

While not shown, it will be appreciated that any of the above-described interstitial spaces 216 can be filled or partially filled with flexible and/or compressible material, such as, but not limited to, urethane. The filler material can be provided in some or all of the interstitial spaces 216 in a manner that customizes a flexibility of the erosion protection system. It will be appreciated that that above-described additive manufacturing techniques are contemplated as being implemented by computer-controlled printers and/or robots. In some embodiments, a substrate can be prepared and provided with erosion protection units prior to installing the erosion protection system to an aircraft. In other embodiments, the substrate, the ligaments, and the scales may be printed, sprayed on, and/or grown directly onto a rotor blade component. It will further be appreciated that directionality of arrays of EPUs, stiffness of one or more of the substrate, ligaments, and scales, and materials utilized for one or more of the substrate, ligaments, and scales can be highly variable and customized or tailored in any desirable manner, including, but not limited to, on a macro layout level or even down to the composition of a single substrate, ligament, scale, or interstitial filler. Finally, it will be appreciated that while the EPSs disclosed are discussed with relation to a tiltrotor aircraft, the EPSs of this disclosure are contemplated as being used on other aircraft aero and non-aero surfaces (wings, noses, boat propellers, air intakes, blades of compressor sections of jet engines, etc.) that can benefit from having high erosion protection without sacrificing flexibility of the component the EPSs are carried on.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the elements required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An erosion protection system (EPS), comprising:
    a first erosion protection unit (EPU), comprising:
        a first ligament; and
        a first scale attached to the first ligament, the first scale comprising an outer hardness that is greater than a hardness of the first ligament; and
    a second EPU, comprising:
        a second ligament; and
        a second scale attached to the second ligament, the second scale comprising
    an outer hardness that is greater than a hardness of the second ligament; and
    an interstitial space between the first ligament and the second ligament;
    wherein at least one of (1) the first scale overlaps at least a portion of the second EPU and (2) the second scale overlaps at least a portion of the first EPU.

2. The EPS of claim 1, wherein at least one of the first ligament and the second ligament are configured to selectively deform from an undeformed state into a deformed state in which the at least one of the first ligament and the second ligament occupy at least a portion of the interstitial space.

3. The EPS of claim 1, wherein each of the first ligament and the second ligament are attached to a shared substrate.

4. The EPS of claim 3, wherein the substrate is relatively more flexible than a flexibility of at least one of the first ligament and the second ligament.

5. The EPS of claim 1, wherein at least one of the first scale and the second scale overlap the interstitial space.

6. The EPS of claim 5, wherein the at least one of the first scale and the second scale cover the interstitial space to prevent an erodent particle from entering the interstitial space.

7. The EPS of claim 1, wherein at least one of the first scale and the second scale comprises a cycloid shape.

8. The EPS of claim 1, wherein at least one of the first ligament and the second ligament are responsive to changes in thermal energy so that a predetermined change in thermal energy applied to the at least one of the first ligament and the second ligament causes movement of at least one of the first scale and the second scale.

9. The EPS of claim 2, further comprising:
    a filler disposed in the interstitial space, the filler being configured to deform in response to the at least one of the first ligament and the second ligament occupying at least a portion of the interstitial space.

10. The EPS of claim 1, wherein each of the first scale and the second scale comprise a maximum dimension of less than or equal to about 0.15 inches.

11. A rotor blade for a helicopter, comprising:
    an upper surface;
    a lower surface;
    a leading edge between the upper surface and the lower surface; and an erosion protection system (EPS) disposed on at least one of the upper surface, the lower surface, and the leading edge, the EPS comprising:
   a first erosion protection unit (EPU), comprising:
      a first ligament; and
      a first scale attached to the first ligament, the first scale comprising an outer hardness that is greater than a hardness of the first ligament; and
   a second EPU, comprising:
      a second ligament; and
      a second scale attached to the second ligament, the second scale comprising an outer hardness that is greater than a hardness of the second ligament; and
   an interstitial space between the first ligament and the second ligament;
   wherein at least one of (1) the first scale overlaps at least a portion of the second EPU and (2) the second scale overlaps at least a portion of the first EPU.

12. The rotor blade of claim 11, wherein at least one of the first ligament and the second ligament are configured to selectively deform from an undeformed state into a deformed state in which the at least one of the first ligament and the second ligament occupy at least a portion of the interstitial space.

13. The rotor blade of claim 11, wherein each of the first ligament and the second ligament are attached to a shared substrate.

14. The rotor blade of claim 13, wherein the substrate is relatively more flexible than a flexibility of at least one of the first ligament and the second ligament.

15. The rotor blade of claim 11, wherein at least one of the first scale and the second scale overlap the interstitial space.

16. The rotor blade of claim 15, wherein the at least one of the first scale and the second scale cover the interstitial space to prevent an erodent particle from entering the interstitial space.

17. The rotor blade of claim 11, wherein at least one of the first scale and the second scale comprises a cycloid shape.

18. The rotor blade of claim 11, wherein at least one of the first ligament and the second ligament are responsive to changes in thermal energy so that a predetermined change in thermal energy applied to the at least one of the first ligament and the second ligament causes movement of at least one of the first scale and the second scale.

19. The rotor blade of claim 12, further comprising:
   a filler disposed in the interstitial space, the filler being configured to deform in response to the at least one of the first ligament and the second ligament occupying at least a portion of the interstitial space.

20. The rotor blade of claim 11, wherein each of the first scale and the second scale comprise a maximum dimension of less than or equal to about 0.15 inches.

* * * * *